B. SEIDEL.
SIGNAL LANTERN.
APPLICATION FILED SEPT. 6, 1907.
917,368.
Patented Apr. 6, 1909.
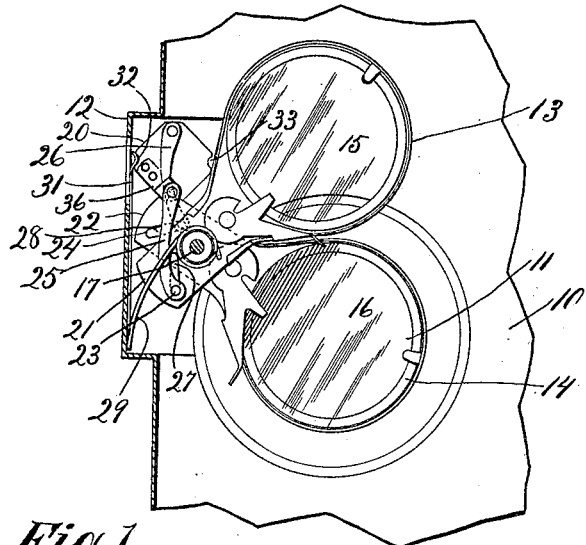
Fig.1.
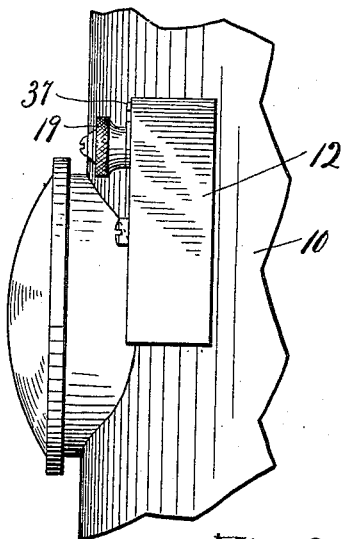
Fig.2.
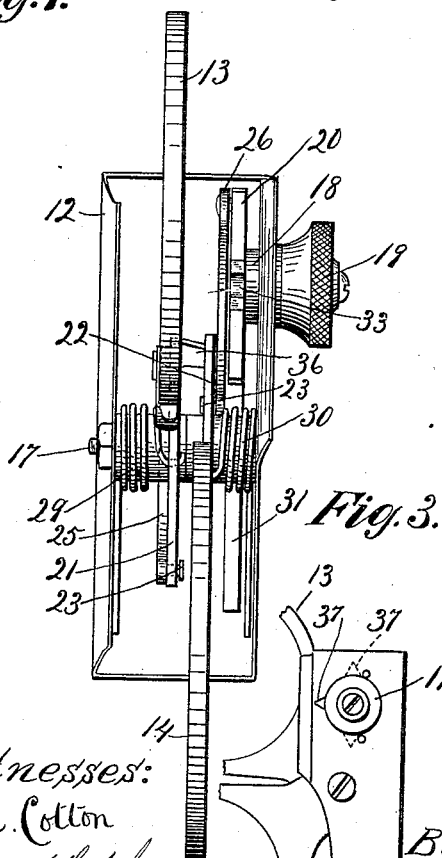
Fig.3.
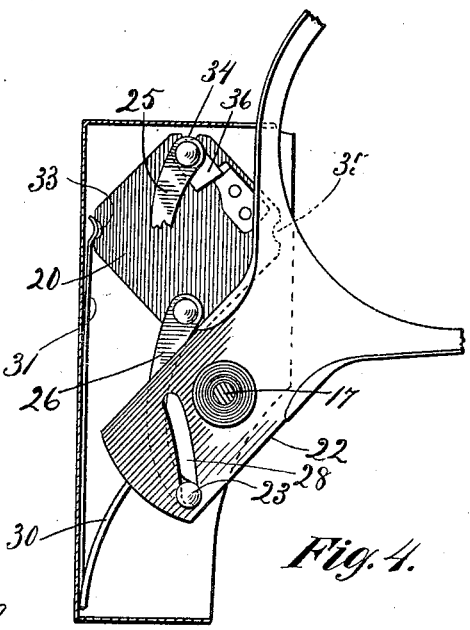
Fig.4.
Fig.5.
Witnesses:
W. H. Cotton
E. M. Klatcher
Inventor:
Bruno Seidel
By Louis R. Gillespy
Atty.

UNITED STATES PATENT OFFICE.

BRUNO SEIDEL, OF CHICAGO, ILLINOIS.

SIGNAL-LANTERN.

No. 917,368.            Specification of Letters Patent.            Patented April 6, 1909.

Application filed September 6, 1907. Serial No. 391,568.

*To all whom it may concern:*

Be it known that I, BRUNO SEIDEL, a citizen of the United States, and resident of Chicago, county of Cook, and State of Illinois, have invented certain new and useful Improvements in Signal-Lanterns, of which the following is a specification, and which are illustrated in the accompanying drawings, forming a part thereof.

The invention relates to that type of signal lantern in which there is provided a light-emitting lens and colored glasses mounted to be moved into and out of register therewith.

The invention relates more specifically to the mechanism for controlling the frames carrying the color glasses; and it consists in the device hereinafter described and which is illustrated in the accompanying drawings, in which—

Figure 1 is a detail sectional view of a lantern showing the signal glass-holders in elevation; Fig. 2 is a detail side elevation of the lantern showing the casing for carrying the signal glass-holders; Fig. 3 is an inside view of the casing for carrying the signal glass-holders, and showing the glass-holders and operating mechanism in elevation; Fig. 4 is a sectional detail of the signal glass carrying mechanism. Fig. 5 is a detail elevation of the same.

The body of a lantern is represented at 10, and its light-emitting lens at 11. The casing 12 is attached to the exterior of the body of the lantern and open to its interior. Within this casing there is mounted the signal glass carrying mechanism. This mechanism comprises a pair of apertured frames 13, 14, each carrying a glass plate 15, 16, secured in place by suitable mechanism. The frames 13, 14, are pivoted on a common axis, as shown at 17, within the casing 12, in such position that they may be swung into register with the lens 11 or raised above it. These frames are controlled by means of a short shaft 18, journaled in one of the walls of the casing 12, provided at its outer end with a suitable grip member, such as the knurled nut 19, and at its inner end with a plate 20, preferably squared as shown. The stems 21, 22, of the glass holders 13, 14, are obliquely slotted back of the pivot 17, as shown at 27, 28, and within each of these slots there runs a stud 23, 24, fixed, respectively, to links 25, 26, attached at diametrically opposite corners of the plate 20.

When both of the glass-carrying frames are out of service, in the position occupied by the frame 13 in Fig. 1, the studs 23, 24, will be located at the upper ends of the slots 27, 28, respectively. The plate 20 will be so positioned that the pivots attaching the links 25, 26, thereto will be horizontally alined. The frames 13, 14, are held in the out of service position by any suitable means. As shown, springs 29, 30, are provided for this purpose, each being coiled around the hub of one of the frames and reacting against the inner wall of the casing 12. The plate 20 is held against rotation by any suitable means. For this purpose there is shown a leaf spring 31, fixed to the inner wall of the casing 12 and having at its free end a boss 32, bearing against the periphery of the plate and entering recesses 33, 34 and 35, at its corners. But one of the glass-carrying frames can be lowered at a time, and this is accomplished by turning the grip member 19 to the right or to the left through ninety degrees, the link coöperating with the holder to be lowered rising and drawing the backwardly-projecting stem of the frame upwardly, thus rocking the frame on its pivot and bringing the glass into register with the lantern lens; the pivot coöperating with the frame not brought into service sliding to the lower end of its slot, as in the case of the stud 23 in Fig. 1, thereby positively holding this frame out of service.

To prevent interference of the links with each other, one of them, as 25, is secured to the plate 20 by means of an outstanding bracket 36. The grip member 19 may be provided with a suitable indicator to show the position of the signal glass holders. There is shown for this purpose a finger 37, attached to the shaft 18 outside of the casing 12.

I claim as my invention—

1. In a lantern, in combination, a pair of glass-carrying frames pivoted at a common axis, an oscillating plate, and links connecting the frames and the plate each link having a lost motion engagement with one of the connected members.

2. In a lantern, in combination, a pair of oscillating glass-carrying frames pivoted on a common axis, and each having a slot in its stem, an oscillating actuating member, and links pivotally attached to such member each link having a stud running in the slot of one of the frames.

3. In a lantern, in combination, a pair of oscillating glass-carrying frames each having a slot in its stem, an oscillating actuating member, and links connecting such member with each of the frames and engaging the latter by studs running in the slots thereof.

4. In a lantern, in combination, a pair of oscillating glass-carrying frames each having a slot in its stem, an oscillating actuating member, links connecting such member with each of the frames and engaging the latter by studs running in the slots thereof, and springs for holding the frames in retracted position.

5. In a lantern, in combination, a pair of oscillating glass-carrying frames each having a slot in its stem, an oscillating actuating member, links connecting such member with each of the frames and engaging the latter by studs running in the slots thereof, and means for holding the frames in retracted position.

6. In a lantern, in combination, a pair of glass-carrying frames pivoted at a common axis, a notched oscillating plate, links connecting the frames and the plate each link having a lost motion engagement with one of the connected members, and a detent for engaging the notches of the oscillating plate.

7. In a lantern, in combination, a pair of glass-carrying frames pivoted on a common axis, an oscillating plate, links connecting the frames and the plate each link having a lost motion engagement with one of the connected members, and means for turning the plate.

8. In a lantern, in combination, a pair of oscillating glass-carrying frames, an oscillating actuating plate, links attached to opposite corners of the plate and connected, respectively, with the frames.

9. In a lantern, in combination, a pair of oscillating glass-carrying frames, an oscillating actuating plate, links attached to opposite corners of the plate and each having a lost motion connection with one of the frames.

10. In a lantern, in combination, a pair of oscillating glass-carrying frames each having a slot in its stem, an oscillating actuating plate, links attached to opposite corners of the plate each link having a stud engaging the slot in one of the stems.

11. In a lantern, in combination, a pair of oscillating glass-holding frames having a common axis, a single actuating shaft connected to both frames and arranged to advance them alternately when turned in opposite directions.

12. In a lantern, in combination, a pair of oscillating glass-holding frames having a common axis, a single actuating shaft connected to both frames and arranged to act on them in alternation by movement in opposite directions to advance one and lock the other.

BRUNO SEIDEL.

Witnesses:
LOUIS K. GILLSON,
E. M. KLATCHER.